Jan. 16, 1968    A. J. SCHIE    3,363,325
METHOD AND APPARATUS RELATING TO MEASURING, RECORDING AND
AUTOMATIC REGULATION OF THE MOISTURE OF A RUNNING WEB
Filed April 16, 1965    2 Sheets-Sheet 2

FIG.2

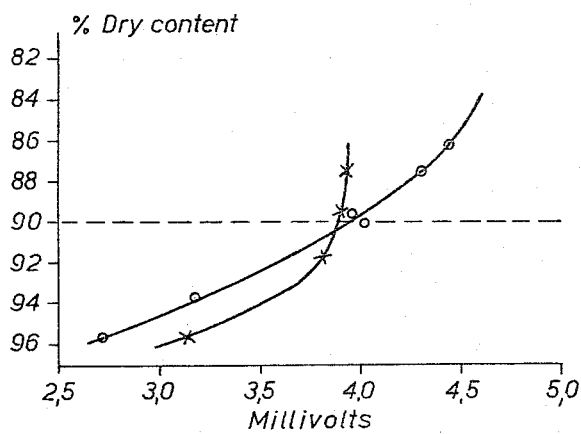

○ E.M.F. Converter +
Current to Air Transducer +
pneumatic pressure
Controller.

× Pneumatic pressure
Controller

FIG.3

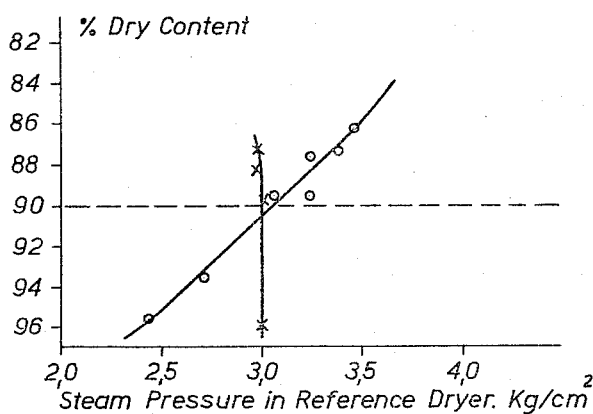

Steam Pressure in Reference Dryer by different Moisture Content in the web

○ E.M.F. Converter +
Current to Air Transducer +
pneumatic pressure
Controller

× Pneumatic pressure
Controller

FIG.4

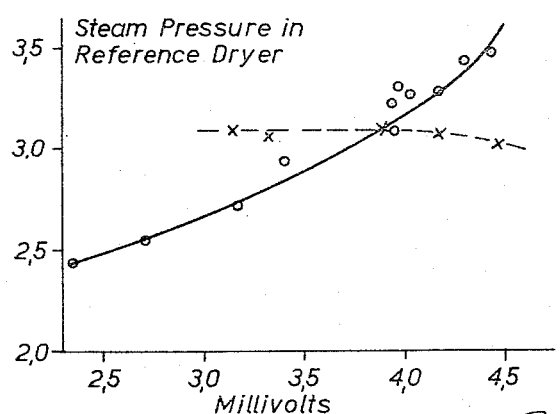

Steam Pressure in Reference Dryer in relation to Millivolts reading from Moisture Measuring Unit ○ E.M.F. Converter +
Current to Air Transducer +
pneumatic pressure
Controller × Pneumatic pressure
Controller Arne Julius Schie,
Inventor
By Wenderoth, Lind & Ponack,
attys

United States Patent Office 3,363,325
Patented Jan. 16, 1968

3,363,325
METHOD AND APPARATUS RELATING TO MEASURING, RECORDING AND AUTOMATIC REGULATION OF THE MOISTURE OF A RUNNING WEB
Arne Julius Schie, Reistad, Drammen, Norway
Filed Apr. 16, 1965, Ser. No. 448,669
5 Claims. (Cl. 34—31)

The invention relates to a method for measuring, recording and automatic regulation of the moisture content of a running web, passing through a drying apparatus comprising a number of drying cylinders in order to dry the web to a certain predetermined moisture content.

The invention further comprises an apparatus to carry out the method.

Patent No. 2,611,974 granted September 30, 1952, shows a method to utilize the temperature differential between two fixed points in the last part of the cylinder drying unit and measured by means of thermo-couples to determine the moisture content of the web at this position, the method being based on the condition that the temperature at the point where the highest temperature occurs, is maintained constant within certain limits, preferably at approximately 100° C.

The same patent also shows that the measured temperature differential stands in a certain constant relationship to the moisture content of the web at the measuring point in such a manner, that the thermocouple current goes towards a maximum at increasing moisture content until it reaches a certain level, and in the opposite direction, i.e., increasingly drier web, it ultimately reaches such a level, that the measured temperature differential goes towards zero.

The invention is generally based on the idea that the temperature is not sought to be maintained approximately constant at the measuring point for the highest temperatures, but on the contrary is based on the condition that an increase in the temperature on the measuring point takes place with increasing moisture content in the web proper, and which is being passed through the cylinder drying unit in order to be dried.

In order that the invention might be more easily understood, it shall in the following be described in connection with the accompanying schematic drawings, wherein, FIG. 1 is a schematic view showing the last drying cylinders in a cylinder drying unit, wherein the measuring of the moisture content takes place by means of one or more thermo-couples, which measures the temperature difference between a point on the last drying cylinder and a point on the web at a predetermined distance subsequent to the point where the web is leaving the cylinder.

In FIG. 2 is shown diagrammatically an impulse curve at an arrangement in accordance with the invention in comparison with an impulse curve for substantially constant steam pressure in the impulse cylinder in a per se known fashion.

In FIG. 3 is shown diagrammatically the relationship between the moisture content in the web and the steam pressure in the impulse cylinder for the same observations as shown in FIG. 2.

FIG. 4 is shown diagrammatically for the same observations as above described, the relationship pressure in the impulse cylinder versus millivolt from the thermo-couples.

The relationship between the moisture content of the web and the measured temperature differential, by means of the current generated in the thermo-couples yields a curve having a definite course, and which is shown diagrammatically in FIG. 2, wherein the measuring points are marked with cross-marks. With increasing moisture content in the web one will note, that the course of the curve is going steadily more vertically, which means, that the thermo current used as an impulse for the moisture content of the web gradually will decrease in sensitivity.

In practice it has also proved to be a difficult task to maintain the temperature at the cylinder surface sufficiently constant at increasing moisture contents in the web, because the cylinder surface will present a decreasing temperature along with increasing moisture content in the web. This condition will lead to, when the moisture content in the web is reaching above a certain level, that the thermo current, due to the reduced cylinder temperature, is not any longer increasing along with increasing moisture content, such that the thermo current in fact will decrease when a certain moisture content in the web is being surpassed. That, by means of thermo elements measured temperatures differential is therefore at such high moisture contents not any longer useable as an impulse for indicating the moisture content of the web. Or expressed in other words, the upper limit for the utilization range has in such cases been surpassed.

The present invention has the following main objects:

(1) To alter the course of the curve for the relationship between the moisture content of the web and the thermo-couple current so that:

(I) The curve path is assuming a less steep course at increasing moisture contents in the web, i.e., the output from the thermo-couples being utilized as an impulse indicating the moisture content in the web at the fixed measuring points is at increasing moisture content becoming more sensitive.

(II) The upper limit for the utilization of the above mentioned measuring method including thermo-couples for measuring of the temperature differential at two fixed points adjacent the travelling web for determination of the moisture content in the web at this point can be increased, i.e., the new method in accordance with the invention can be utilized for a higher moisture content in the web, without creating any danger that the upper utilization limit shall be surpassed.

Figure 1:
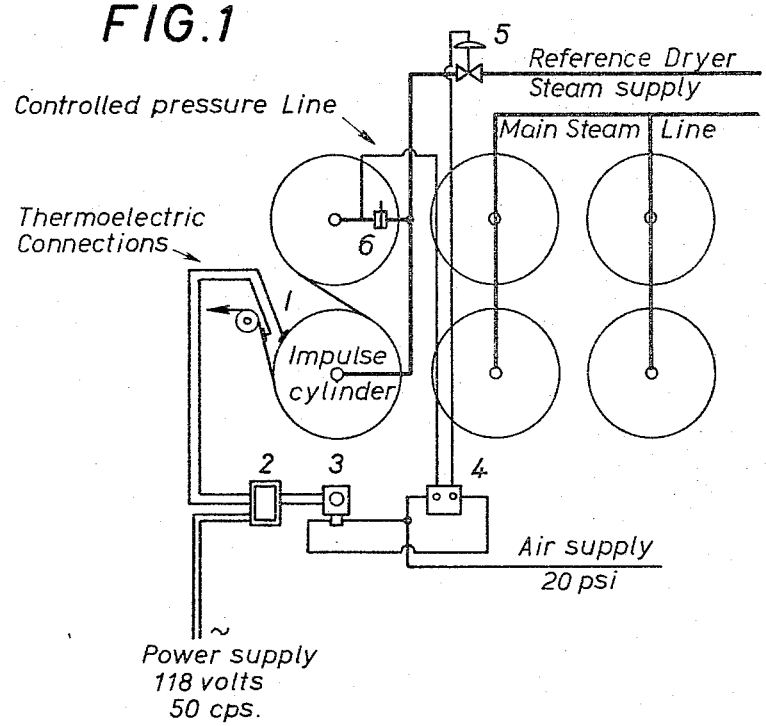

A practical embodiment of an apparatus in accordance with the invention and whereby the method as above defined may be utilized is shown in FIG. 1 where station 1 is schematically indicating the thermo-couples which are utilized for determining the moisture content on this point.

The thermo current generated in the thermo-couples is supplied to a means for converting the thermo current to a monitoring current, station 2, for instance a conversion from millivolt to milliampere. This milliampere impulse can then for instance be further converted to an air pressure impulse in a further converting means, indicated at station 3. Such air pressure impulse can be used for remote set control (Kaskade Control) of the pressure controller of suitable type, indicated at station 4, which further can control the steam pressure in the impulse cylinder by means of a diaphragm control valve shown at station 5.

The system schematically shown in FIG. 1 operates as follows:

At a change in the moisture content in the travelling web at the measuring point subsequent to the impulse cylinder, the thermo current generated in the thermo-couples will show a corresponding change. Let us assume for instance, that the web is becoming more moisty. The thermo current will then increase, and by means of the converter means at station 2 and station 3 a corresponding change will take place in the pressure impulse which is supplied to the pressure regulators remote control at this specific pressure adjustment setting. The pressure regulator is then readjusted such that the steam pressure is increased, and consequently the steam pressure in the impulse cylinder will become higher. By means of this system therefore the impulse cylinder will be subject to a steam pressure, which steadily is maintained in a certain relationship to the current generated in the thermo-couples, and consequently always will appear in a certain relationship to the moisture content in the web at the measuring point.

In FIG. 1 is further shown an orifice plate positioned upstreams of the inlet to the next to the last cylinder, at station 6. The steam flows into this cylinder through said orifice plate, and there is created a certain pressure drop in the steam at the passage through the orifice plate. When then, for instance the moisture content in the web, which is passed for drying along the next last cylinder, increases, the steam consumption in the cylinder will increase correspondingly, and the steam flow which is passing the orifice plate will increase correspondingly, and the pressure drop in the steam across the orifice plate will also increase correspondingly. And oppositely, when the web is becoming drier, the pressure drop across the orifice plate will be less.

The impulse pipe for the steam pressure to the pressure regulator is lead off from the steam pipe subsequent to the orifice plate as shown in FIG. 1. The pressure regulator attempts to maintain a constant steam pressure at the next to the last cylinder. Whereupon the variations in the pressure drop across the orifice plate will influence on the steam pressure at the primary side of the orifice plate. As is shown in FIG. 1, the two last cylinders have common supply pipe for steam from the diaphragm valve, and the above mentioned pressure variations, which are generated at the primary side of the orifice plate due to the variations in the steam consumption of the next to the last cylinder, will thereby in the system shown in FIG. 1 influence directly the steam pressure in the impulse cylinder.

By means of the system above described by use of an orifice plate the surface temperature of the impulse cylinder will thus increase in a certain relationship with increasing moisture content of the running web, and to the contrary, it will be reduced in a certain relationship, when the moisture content in the web is becoming less during the passage over to the next to the last cylinder.

The pressure variations in the steam pressure in the impulse cylinder will then, due to the variations in the pressure drop across the orifice plate, work together with the priorly mentioned pressure variations in the impulse cylinder which is generated due to the variations in the thermo current rate from the thermo-couples.

On the primary side of the orifice plate pressure variations will thus occur, which partly arise from the pressure variations produced by the moisture variations in the web and transferred by means of the thermo-couples together with the amplifier means and the steam pressure regulator, and partly from the variations in the pressure drop across the orifice plate and generated by the varying steam consumption in the next to the last cylinder in relation to the variations in the moisture content in the web at this point.

The pressure variations on the primary side of the orifice plate will therefore, across the orifice plate, influence also the steam consumption of the next to the last cylinder, in such a way, that when the moisture content of the web increases, the steam pressure in the next to the last cylinder will also increase, and oppositely, at increasing dryness in the web, the steam pressure in the next to the last cylinder will decrease.

This significant feature of the system in accordance with the invention has as a result, that the variations in the steam consumption of the next to the last cylinder, due to the variations in the moisture content in the web, and which is passed to the cylinder in order to be dried, will be substantially greater, than if the next to the last cylinder has a constant steam consumption, at the same variations in the moisture content in the web during the passage over the next to the last cylinder.

This property of the new system has as an effect that the impulse curve shown in FIG. 2 attains a course pointing in a more horizontal direction, in other words it will increase the sensitivity of the impulse.

The system will thus present an impulse curve, which has a utilization range up to very high moisture content in the web. In FIG. 2 is shown an impulse curve in an arrangement as above described in comparison with an impulse curve for substantially constant steam pressure in the impulse cylinder and maintained by means of a pressure regulator in the usual manner. FIG. 2 shows, that the impulse curve which is being formed by means of the system in accordance with the invention, has a course which differs substantially in comparison with the impulse curve, which is formed by using a constant pressure regulation of the impulse cylinder alone. FIG. 2 shows, that for a higher moisture content than approximately 10% the impulse curve for the constant pressure regulation alone shows a rather steep course, while on the other hand the impulse curve for the system in accordance with the invention also with a moisture content higher than 10% is continuous with a quite satisfactory angle up to the highest degree of moisture content in the web.

In FIG. 3 is shown diagrammatically the relationship between the moisture content in the web and the steam pressure in the impulse cylinder for the same observations as shown in FIG. 2. It shall be observed, that with the new system in accordance with the invention the steam pressure will increase together with the moisture content in the web and following a substantially straight line having an inclination or slooping angle of above 45°, using the scales as shown. For constant pressure regulation of the impulse cylinder alone on the other hand the steam pressure in the impulse cylinder should be kept as constant as possible. As the observations indicate, it has not been possible to keep the pressure constant in a satisfactory manner, since at the highest moisture contents appearing a certain pressure drop in the cylinder has taken place.

In FIG. 4 is shown diagrammatically, for the same observations as above described, the relationship pressure in the impulse cylinder versus millivolt from the thermo-couples. Again it can be noted, that for the system in accordance with the invention the pressure increase in the impulse cylinder will take place in accordance with a definite curve at increasing moisture content in the web, while the corresponding curve for constant pressure regulation alone shows a decrease in the steam pressure, when the water content in the web is at a high level.

In the example shown in FIG. 1 the next to the last cylinder is selected for the take off of the pressure impulse for the steam to the pressure regulator. Another of the drying cylinders preceding this one in the drying unit can also be selected for the take off of the pressure impulse. The kind of product in question and the design of the drying unit will be determining factors in selecting the best position for the take off of said pressure impulse. If regard only is taken to the steam consumption of the cylinder and seen in relation to the variations in the moisture content in the finished, dried product, a preceding cylinder in the drying unit will generally give the most powerful reactions, in other words it will then prove to be the best selection for the take off of the pressure impulse.

MODIFICATION 1

*Using stations 1, 2, 3, 4 and shown in FIG. 1; only the last cylinder given pressure regulation*

For special drying machines it may be purposely to make one change in the system as above described, namely that the cylinder having the orifice plate is disconnected from the system, such that the take off of the pressure impulse for the steam to the pressure regulators is moved to the impulse cylinder itself, and the diaphragm valve regulates then only the steam supply to the impulse cylinder, where the temperature difference between two fixed points is being measured by means of the thermo-couples.

Such a simplified embodiment of the invention can prove sufficient, when the desired moisture content in the web does not supersede a definite upper limit.

MODIFICATION 2

*Utilization of stations 1, 2, 3, 4 and 5 in FIG. 1; both cylinders on constant steam pressure regulation*

In such cases as mentioned in connection with Modification 1 it can be an advantageous modification of the system as above described to remove the orifice plate, and consequently drive both cylinders as shown in FIG. 1 with the same steam pressure, since in such a case the web temperature at the inlet point on the impulse cylinder, where the thermo-couples are positioned, will be stabilized.

MODIFICATION 3

*Utilization of system as shown in FIG. 1 with the supplement of one preceding cylinder having the same pressure as the impulse cylinder*

Another modification of the system as shown in FIG. 1 and described above would be to take into the system the cylinder, which is positioned preceding the cylinder where is positioned the orifice plate, into the pressure regulated system, such that said cylinder is supplied with steam having the same pressure as the pressure on the primary side of the orifice plate. Such an arrangement would close out the influence on the pressure variations in the upper portion of the drying cylinders upon the steam consumption in that cylinder whereon the orifice plate is positioned at the inlet.

MODIFICATION 3A

Figure 5:
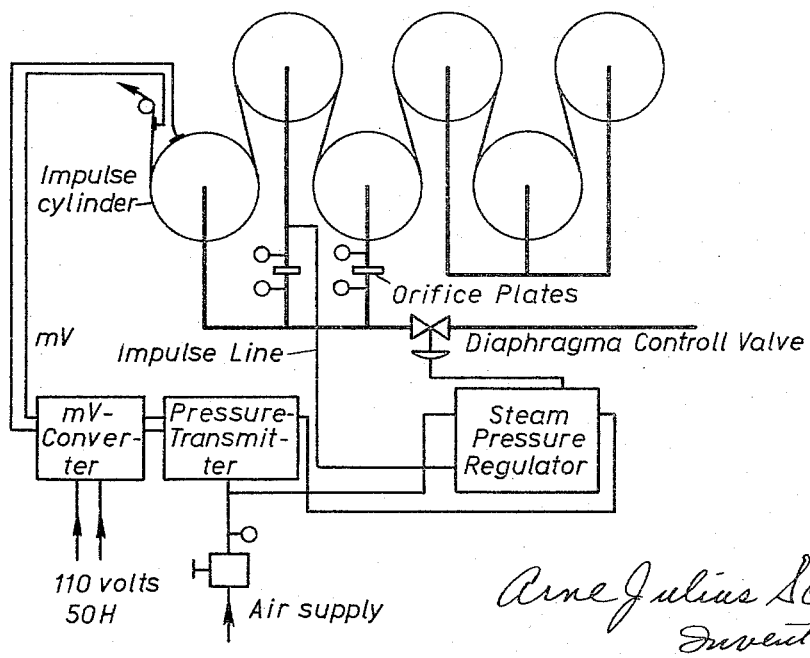
FIG. 5 is a schematic view showing a preferred modification of an apparatus in accordance with the invention.

This modification consists in that the cylinder preceding the cylinder where is positioned the orifice plate, also is furnished with an orifice plate at the inlet, as shown in FIG. 5, and which has the same aperture diameter as the orifice plate in the primarily mentioned cylinder, such that the steam pressure in these two cylinders will be practically identical. Compared with the above mentioned Modification 3 this Modification 3A will give an increased sensitivity, since the cylinder temperature for Modification 3A will be approximately the same for both these cylinders, while for Modification 3 the cylinder preceding the cylinder, whereon is positioned the orifice plate, the steam pressure will increase with an increase in the pressure drop across the orifice plate, and contrary. For Modification 3 the web will therefore at increasing moisture contents in the web, and at a greater pressure drop, arrive somewhat cooler on to the cylinder with the orifice plate, as compared to the same relationship in Modification 3A utilizing two orifice plates. When the web thus is somewhat moist, the Modification 3A therefore will yield a lower web temperature at the inlet on the last cylinder having an orifice plate, in comparison with the Modification 3 subject to otherwise similar conditions. And for a more dry web the Modification 3A will yield a somewhat higher web temperature at the inlet on the last cylinder having an orifice plate in comparison with Modification 3 also under otherwise similar conditions. Therefore, due to these differences in web temperature for Modifications 3 and 3A, the latter will yield somewhat greater differences in the steam consumption for the last cylinder having an orifice plate, compared with Modification 3 under the same conditions, and will therefore result in a greater sensitivity in regard to pressure drops across the orifice plate, than does Modification 3.

The two cylinders being furnished with orifice plates can be positioned just ahead of the impulse cylinder, or they can be positioned somewhat further ahead in the drying cylinder unit. A preferred embodiment of the invention in accordance with Modification 3A is shown schematically in FIG. 5. It will be especially advantageous when it is a question of measuring specially high moisture contents and also when the steam pressure in the drying unit ahead of the cylinders having orifice plates are showing great differences due to change in the requirements for drying of the web in question, and which is passing the drying unit.

MODIFICATION 4

*Utilization of stations 4, 5 and 6 in FIG. 1; pressure regulation only without employment of an impulse from the thermo current for measuring of the temperature difference between said two measuring points*

A further modification and a simplification of the system as above described would be to disconnect or neglect the arrangement with thermo couples having amplifier means and to simply employ a pressure regulator, which receives an impulse from the secondary side of the orifice plate, and which regulates the steam pressure in the impulse cylinder as shown in FIG. 1.

Such an arrangement would, in comparison with regular pressure regulations to constant steam pressure in the impulse cylinder, result in an increase of the upper limit for the utilization of thermo-couples for determining the moisture content in the running web by measuring of the temperature differences between two fixed points in the drying unit.

This system will give an increase in the pressure in the impulse cylinder, when the pressure drop across the orifice plate is increasing, as a result of the fact that the moisture content in the web, and which is passed for drying over the cylinder, increases. This system will therefore give an impulse curve having a less steep course at higher moisture contents in the web in comparison with pressure regulation to constant steam pressure in the impulse cylinder alone, and since the steam consumption of a cylinder continuously increases together with increasing moisture content in the web, which is passed for drying over the cylinder, the upper utilization range for the measuring methods with thermocouples measuring the temperature differences between two stationary or fixed points in the drying unit will increase for determining of the moisture content in the web.

*Alternative embodiments of the measuring elements for obtaining the temperature differences*

The measuring elements for obtaining the temperature difference between said two fixed points in the drying unit may be given various forms, such that they are adapted to the type of drying machinery in question.

The measuring elements will in general consist of several thermo-couples which are coupled in series to a so called thermo column, and the thermo voltage generated is supplied to the converter at station 2 in FIG. 1.

The separate thermo-couples are then preferably distributed across the width of the web. If for instance, there is found a need for five separate thermo-couples in order to generate a millivoltage having a suitable rate, so can these five separate thermo-couples be distributed at equally spaced distances across the width of the web. The voltage generated will in a such arrangement represent an average of the moisture content in the entire width of the web, and such a means will give the best basis for regulation of the steam pressure in the impulse cylinder in accordance with the new system in accordance with the invention which is generally illustrated in FIG. 1.

The voltage from the measuring elements can in addition to being utilized in the new system for pressure regulation of the impulse cylinder also be utilized for automatic regulation of the steam supply to the entire remainder of the drying unit or to a section only of the drying unit, that is a number of drying cylinders. The millivoltage from the mesuring elements can, via M.N. converter at station 2 and the pressure converter at station 3 then simultaneously be utilized as an impulse for pressure regulation of the impulse cylinder, as described, and as an impulse to a second steam pressure regulator of suitable type for automatic regulation of the steam supply to the remainder of the drying unit or to a section of such unit.

The steam pressure regulator will then control, in a per se known manner the steam supply to the remainder of the drying unit in such a way that the millivoltage generated in the measuring elements are kept constant on the specific value, which is set on the scale on the regulator. And, since a certain specific constant relationship is prevailing between the millivoltage generated in the measuring elements and the moisture content in the web at the measuring point, see FIG. 1, the moisture content in the web will in this way be kept constant.

In accordance with an alternative method a separate thermo column is used as a basis for automatic regulation of the remainder of the drying unit or a section of such unit except for the two cylinders which are utilized in the system as above described. This separate thermo column is preferably built up of other thermo-couples than those which are utilized in connection with the new system, and the distribution of these thermo-couples across the width of the web must be selected in accordance with any specific requirements.

One may for instance, position a thermo column which is covering the first 25% of the width of the web, a second thermo column which is covering the next 25% of the width of the web and so on. By such a system it is possible to measure the moisture content of the web for each 25% width of the web, and the automatic regulation of the steam supply to the remainder of the drying unit or to a section of such a drying unit can be controlled from one of these thermo columns, which is covering a certain part of the width of the web.

The specific product in question will be decisive in a determination of which system one shall select. For the drying of cellulose for instance, which is sold on the market on the basis of average dry mass, usually on the basis of 90% dry mass, will an embodiment of the impulse element as the following be very suitable:

(1) One common thermo column can be utilized in the impulse element for the pressure regulations of the impulse cylinder and for the automatic regulation of the steam supply to the remainder of the drying unit. This thermo column is preferably so designed, that the separate thermo couples are evenly spaced across the entire width of the web, such that the millivoltage generated in the thermo column represents an average of the moisture content in the entire cross section.

(2) A separate thermo column consisting of a certain number of separate thermo-couples and evenly spaced across the entire width of the web and giving an impulse for regulation of the remainder of the drying unit on the basis of average moisture content, and a corresponding separate thermo column giving impulse to the pressure regulation of the impulse cylinder. Across the width of the web can then be positioned sectionally positioned thermo-couples, for instance four sections, such that each section covers 25% of the width of the web with the separate thermo-couples and such that the millivoltage from each section can be recorded. In such a system the automatic regulation of the drying unit may be carried out on the basic of average moisture content in the product, for instance cellulose, and the four recorded curves will each show the moisture content in average for each 25% of the width of the web, and thus give sufficient information as to the uniformity of the web across the same.

In connection with paper production it will usually be preferred that the automatic regulation of the steam supply to the remainder of the drying unit, except the cylinders utilized for the pressure regulations of the impulse cylinder, in accordance with the new system, takes place on the basis of the millivoltage from a thermo column positioned across a limited portion of the width of the web. Five such thermo columns may for instance be arranged, such that each cover ⅕ of the width of the web, and in accordance with desire one of these five thermo columns can then be utilized as a basis for the automatic regulation of the remainder of the drying unit, and furthermore the five thermo columns are recorded. When operating on such a system the portion of the web containing most moisture may be connected on automatic regulation, this being most preferable in connection with paper production, since the moisture in this portion then can be kept close up to the maximum allowable level, and one has a guarantee that the moisture content in the web otherwise will be below this maximum allowable moisture level.

I claim:

1. A method for measuring the moisture content of a running web being dried by passage through a drying apparatus having a plurality of steam drying cylinders, comprising measuring the differential of temperature of the web between two fixed spaced points at one of the cylinders by thermo couple elements, said differential of temperature being measured between the surface of a cylinder and said web at a predetermined distance from said cylinder, supplying the impulses from said thermo couple elements to amplifier and converter means, utilizing the output from said converter means to increase or decrease the steam pressure on said cylinder, thereby maintaining and varying the steam pressure in said cylinder in proportional relationship to an increase or decrease of the value of the thermo current from said thermo couple elements.

2. A method for measuring the moisture content of a running web being dried by passage through a drying apparatus having a plurality of steam drying cylinders wherein the differential of temperature of the web is measured between two fixed spaced points at one of the cylinders by thermocouple elements between the surface of a cylinder and said web at a predetermined distance from said cylinder, then supplying the impulses from said thermo couple elements to amplifier and converter means and utilizing the output from said converter means to increase or decrease the steam temperature on said cylinder to maintain and vary the steam pressure in said cylinder in proportional relationship to an increase or decrease of the value of the thermocurrent from said thermo couple elements, the improvement comprising providing a certain pressure drop in the steam passing the orifice plate at the steam inlet of a cylinder preceding said first mentioned cylinder and then taking a pressure impulse from the steam line after said orifice plate and supplying said pressure impulse to said converter and amplifier means.

3. A method for measuring the moisture content of a running web being dried by passage through a drying apparatus having a plurality of steam drying cylinders wherein the differential of temperature of the web is measured between two fixed spaced points at one of the cylinders by thermocouple elements between the surface of a cylinder and said web at a predetermined distance from said cylinder, then supplying the impulses from said thermo couple elements to amplifier and converter means and utilizing the output from said converter means to increase or decrease the steam temperature on said cylinder to maintain and vary the steam pressure in said cylinder in proportional relationship to an increase or decrease of the value of the thermocurrent from said thermocouple elements, the improvement comprising regulating separately the steam pressure from said converter and amplifier means and then supplying said regulated steam pressure to an impulse cylinder.

4. A method for measuring the moisture content of a running web being dried by passage through a drying apparatus having a plurality of steam drying cylinders wherein the differential of temperature of the web is measured between two fixed spaced points at one of the cylinders by thermocouple elements between the surface of a cylinder and said web at a predetermined distance from said cylinder, then supplying the impulses from said thermocouple elements to amplifier and converter means and utilizing the output from said converter means to increase or decrease the steam temperature on said cylinder to maintain and vary the steam pressure in said cylinder in proportional relationship to an increase or decrease of the value of the thermocurrent from said thermo couple elements, the improvement comprising supplying a steam supply in common with the supply for the impulse cylinder to an additional drying cylinder added to said drying apparatus positioned preceding a cylinder with an orifice plate.

5. A method for measuring the moisture content of a running web being dried by passage through a drying apparatus having a plurality of steam drying cylinders wherein the differential of temperature of the web is measured between two fixed spaced points at one of the cylinders by thermocouple elements between the surface of a cylinder and said web at a predetermined distance from said cylinder, then supplying the impulses from said thermo couple elements to amplifier and converter means and utilizing the output from said converter means to increase or decrease the steam temperature on said cylinder to maintain and vary the steam pressure in said cylinder in proportional relationship to an increase or decrease of the value of the thermocurrent from said thermocouple elements, the improvement comprising supplying the voltage from said thermo couple elements to said converter and amplifier means simultaneously as the steam pressure impulse from a position after the orifice plate of a cylinder preceding said first mentioned cylinder to maintain the steam pressure after said orifice plate in a certain definite proportional relationship to an increase or decrease of the value of the thermo current from said thermo couple elements.

References Cited
UNITED STATES PATENTS

| | | | |
|---|---|---|---|
| 2,208,784 | 7/1940 | Armstrong | 34—48 |
| 2,611,974 | 9/1952 | Stratveit et al. | 34—41 |

KENNETH W. SPRAGUE, *Primary Examiner.*